US007850325B2

(12) United States Patent
Wall et al.

(10) Patent No.: US 7,850,325 B2
(45) Date of Patent: Dec. 14, 2010

(54) LIGHT SOURCE AND WIRING CONFIGURATION FOR POWER TOOL

(75) Inventors: Daniel Paxton Wall, Medina, TN (US); Craig A. Carroll, Milan, TN (US); Kevin Maurice Alston, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 3 days.

(21) Appl. No.: 12/274,451

(22) Filed: Nov. 20, 2008

(65) Prior Publication Data

US 2009/0141482 A1 Jun. 4, 2009

Related U.S. Application Data

(60) Provisional application No. 61/004,818, filed on Nov. 30, 2007.

(51) Int. Cl.
*B23C 1/20* (2006.01)

(52) U.S. Cl. ......................... 362/119; 362/120; 408/16; 408/124; 409/182

(58) Field of Classification Search ................. 362/119, 362/120; 409/137, 182; 408/16, 124; 144/48.1, 144/135.2
See application file for complete search history.

(56) References Cited

U.S. PATENT DOCUMENTS

| | | | | |
|---|---|---|---|---|
| 2,852,051 | A | 9/1958 | Bickner | |
| 4,051,880 | A | 10/1977 | Hestily | |
| 4,340,326 | A | 7/1982 | Buonauro et al. | |
| 4,642,738 | A | 2/1987 | Meller | |
| 5,921,654 | A | 7/1999 | Coyle | |
| 6,443,675 | B1 | 9/2002 | Kopras et al. | |
| 6,713,905 | B2 | 3/2004 | Hirschburger et al. | |
| 6,726,414 | B2 | 4/2004 | Pientka et al. | |
| 6,858,857 | B2 | 2/2005 | Pease et al. | |
| 6,886,961 | B2 * | 5/2005 | Hara et al. | 362/652 |
| 6,890,135 | B2 * | 5/2005 | Kopras et al. | 409/182 |
| 6,981,779 | B2 | 1/2006 | Fukuoka | |
| 7,094,011 | B2 * | 8/2006 | Kopras et al. | 409/137 |
| 7,137,327 | B2 * | 11/2006 | Garcia et al. | 83/102.1 |
| 7,137,761 | B2 | 11/2006 | Hara et al. | |
| 7,152,329 | B2 * | 12/2006 | Kondo et al. | 30/392 |
| 2002/0172035 | A1 * | 11/2002 | Hara et al. | 362/119 |
| 2005/0025599 | A1 * | 2/2005 | Kopras et al. | 409/182 |
| 2005/0085124 | A1 | 4/2005 | Kristen et al. | |

* cited by examiner

*Primary Examiner*—Anabel M Ton
(74) *Attorney, Agent, or Firm*—Harness, Dickey & Pierce, P.L.C.

(57) ABSTRACT

A power tool includes a motor, a lighting power source, and a housing assembly defining an axis that supports the motor and the lighting power source. The power tool also includes a lighting assembly with a light and an energy line that transmits energy to the light to thereby provide illumination. The light and the lighting power source are disposed in spaced relationship from each other relative to the axis. Furthermore, the power tool includes a light holder supported by the housing assembly. The light holder supports the light and a portion of the energy line such that an end of the energy line unsupportedly extends beyond the light holder and electrically couples to the lighting power source.

24 Claims, 5 Drawing Sheets

LIGHT SOURCE AND WIRING CONFIGURATION FOR POWER TOOL

CROSS REFERENCE TO RELATED APPLICATION

This application claims the benefit of U.S. Provisional Application No. 61/004,818, filed on Nov. 30, 2007, the disclosure of which is incorporated herein by reference in its entirety.

FIELD

The present disclosure relates to a power tool and, more particularly, relates to a light source and wiring configuration for a power tool.

BACKGROUND

The statements in this section merely provide background information related to the present disclosure and may not constitute prior art.

Power tools have been adapted for various uses, such as routing, drilling, milling, cutting, and other purposes. These power tools facilitate woodworking, metalworking, material reduction, and other projects.

Power tools have also been adapted to include lights. The lights provide helpful illumination for a work area, such as a surface of a workpiece. However, the lights and the associated wiring typically increase the size and bulkiness of the power tool. Furthermore, the light and the associated wiring can be difficult to assemble with the other components of the respective power tool.

SUMMARY

A power tool is disclosed that includes a motor, a lighting power source, and a housing assembly defining an axis that supports the motor and the lighting power source. The power tool also includes a lighting assembly with a light and an energy line that transmits energy to the light to thereby provide illumination. The light and the lighting power source are disposed in spaced relationship from each other relative to the axis. Furthermore, the power tool includes a light holder supported by the housing assembly. The light holder supports the light and a portion of the energy line such that an end of the energy line unsupportedly extends beyond the light holder and electrically couples to the lighting power source.

In another aspect, a power tool is disclosed that includes a motor with a field member that creates a magnetic field, a lighting power source, and a housing assembly defining an axis. The housing assembly includes a field case that at least partially encases the field member and an outer housing member that at least partially encases the field case and the field member. The field case includes an opening. Moreover, the power tool includes a lighting assembly with a light and an energy line that transmits energy from the lighting power source to the light to thereby provide illumination. The light and the lighting power source are disposed in spaced relationship from each other relative to the axis, and the energy line extends through the opening in the field case. Furthermore, the power tool includes a light holder supported by the housing assembly. The light holder supports the light and the energy line.

In a preferred embodiment, a router is disclosed that includes a motor with a field member that creates a magnetic field, a spindle assembly that is drivingly rotated by the motor, and a lighting power source. The router also includes a housing assembly that defines an axis and that supports the motor and the lighting power source. The housing assembly includes a field case that at least partially encases the field member. The field case includes an outer wall and a cap that covers the field member, and the field case defines an opening through the cap. The housing assembly also includes an outer housing member that at least partially encases the field member and the field case. Moreover, the router includes a lighting assembly with a light emitting diode and an energy line that transmits energy to the light emitting diode to thereby provide illumination. The light emitting diode and the lighting power source are disposed in spaced relationship from each other relative to the axis. The router further includes a light holder made out of a light-transmissive material. The light holder includes a ring and an arm that is integrally attached to the ring and extends therefrom. The ring encircles the spindle assembly, and the ring includes a light cup in which the light emitting diode is received. The ring also includes an outer wall and an inner wall that is coupled to and disposed in spaced relationship relative to the outer wall to define a line pocket between the inner and outer walls that receives a first portion of the energy line. The arm includes a line retainer that retains a second portion of the energy line. The light holder is received in a recess of the field case between the field case and the outer housing member. Moreover, an end of the energy line extends unsupportedly beyond the arm, through the opening of the cap, and electrically couples to the lighting power source.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
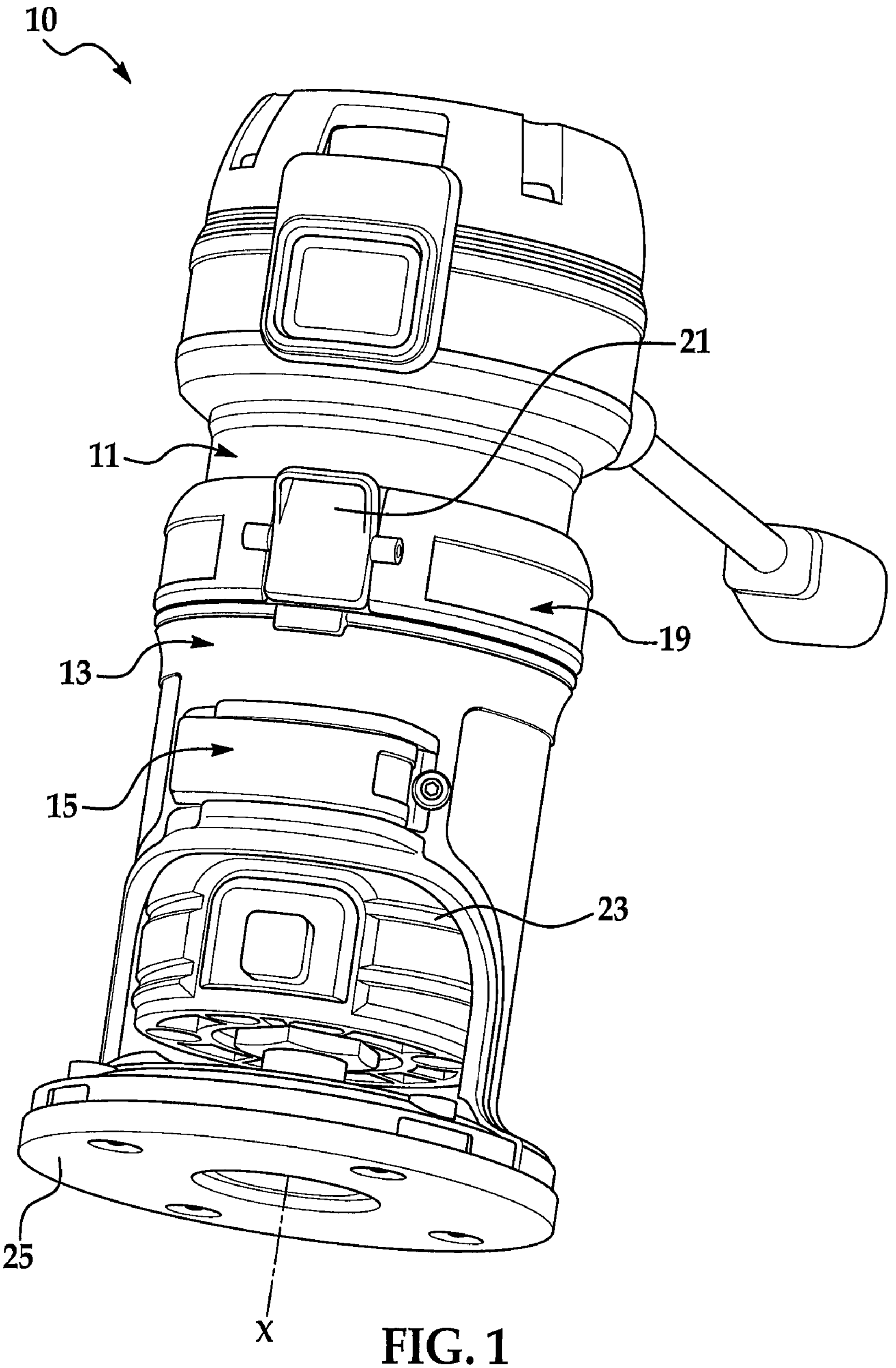
FIG. 1 is a perspective view of an embodiment of a power tool according to the present disclosure.

The following description is merely exemplary in nature and is not intended to limit the present disclosure, application, or uses. It should be understood that throughout the drawings, corresponding reference numerals indicate like or corresponding parts and features.

Referring initially to FIG. 1, a power tool 10 is illustrated. In the embodiment shown, the power tool 10 is a router; however, the power tool 10 could be of any suitable type without departing from the scope of the present disclosure. It will also be appreciated that certain components of the power tool 10 are not shown for purposes of clarity.

As shown, the power tool 10 generally includes a motor assembly 11 and a base assembly 13. The motor assembly 11 can drivingly rotate a tool (not shown) such as a router bit. The base assembly 13 supports the motor assembly 11. In the embodiment shown, the position of the motor assembly 11 relative to the base assembly 13 is adjustable along an axis X of the motor assembly 11. For instance, a clamp assembly 15 is included on the base assembly 13. The clamp assembly 15 can be closed (as shown in FIG. 1) such that the clamp assembly 15 applies a retaining force to the motor assembly 11 to retain the motor assembly 11 in position relative to the base assembly 13. The clamp assembly 15 can also be opened (not shown) such that the position of the motor assembly 11 can be changed relative to the base assembly 13.

The power tool 10 also includes a height adjusting mechanism 17. In the embodiment shown, the height adjusting mechanism 17 includes a dial 19 provided near a top end of the base assembly 13 so as to encircle the motor assembly 11. The dial 19 is threaded on its inner surface so as to threadably engage with a thread 23 provided on an outer surface of the motor assembly 11. At least one release member 21 is coupled to the dial 19 and releasably couples the dial 19 to the base assembly 13. Thus, assuming the clamp assembly 15 is in the open position, rotation of the dial 19 threadably advances the motor assembly 11 in either the downward or upward direction along the axis X relative to the base assembly 13. Also, the release member 21 can be biased such that the release member 21 disengages from the base assembly 13, and the motor assembly 11 can slide out from the base assembly 13, leaving the dial 19 threadably coupled to the motor assembly 11.

In the embodiment shown, the base assembly 13 includes a support 25 on a lower end thereof. The support 25 is flat and disc-shaped. In one embodiment, the support 25 is made of a transparent material. The power tool 10 can be supported on a workpiece (not shown) via the support 25.

In the embodiment shown, the base assembly 13 is a fixed base, meaning that the base assembly 13 is rigid and the height adjusting mechanism 17 is used to adjust the height of the motor assembly 11 relative to the workpiece. However, it will be appreciated that the base assembly 13 could be a plunge base assembly 13 such that the base assembly 13 is selectively collapsible to actuate the motor assembly 11 toward and away from the workpiece without departing from the scope of the present disclosure.

Figure 2:
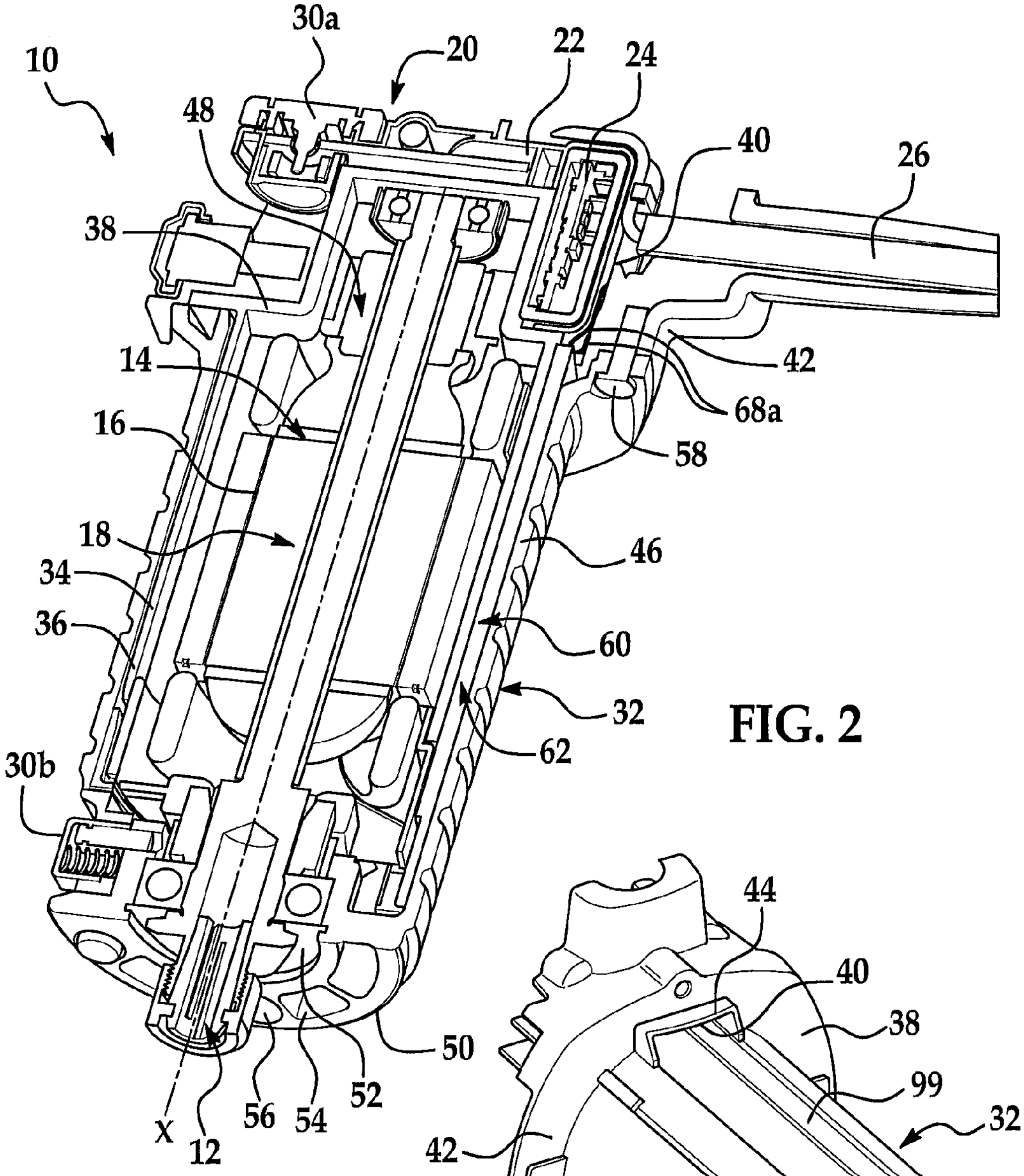
FIG. 2 is a perspective sectional view of the power tool of FIG. 1.

Referring now to FIG. 2, the motor assembly 11 is shown in greater detail. As shown, the motor assembly 11 includes a spindle assembly, generally indicated at 12. The spindle assembly 12 is rotatable as will be discussed. A tool, such as a routing bit, can be removably attached to the spindle assembly 12.

The motor assembly 11 further includes a motor, generally indicated at 14. In the embodiment shown, the motor 14 is an electric motor that includes a field member 16 that creates a magnetic field, an armature 18, as well as various other components well known in the art. The motor 14 is operable for rotating the spindle assembly 12. It will be appreciated that the motor 14 could be of any suitable type, electric or otherwise, without departing from the scope of the present disclosure.

Figure 4:
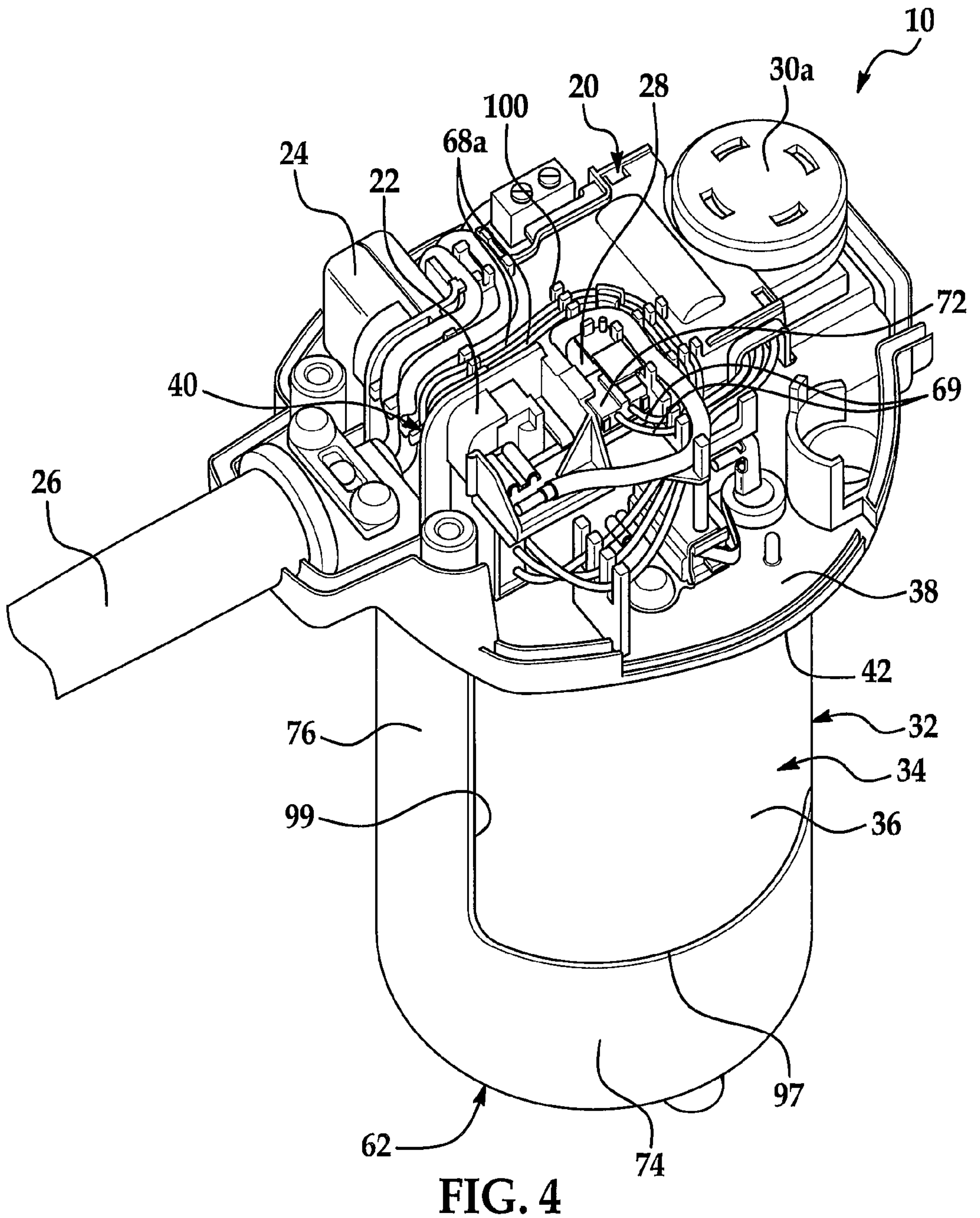
FIG. 4 is a perspective view of an upper end of the power tool of FIG. 1.

The power tool 10 further includes an electronics assembly, generally indicated at 20. As shown in FIGS. 2 and 4, the electronics assembly 20 includes a circuit board 22 and a controller 24. The circuit board 22 and controller 24 include a plurality of circuits and other electronic components as well as programmed logic for controlling the power tool 10. The electronics assembly 20 also includes a power cord 26 that supplies power to the electronics assembly 20. It will be appreciated that the power tool 10 could be a cordless power tool 10 without departing from the scope of the present disclosure.

Also, the electronics assembly 20 includes a lighting power source 28 (FIG. 4). In the embodiment shown, the lighting power source 28 is mounted to the circuit board 22 and includes a female connector. The lighting power source 28 is in electrical communication with the power cord 26.

The power tool 10 further includes user controls 30*a*, 30*b*. The user controls 30*a*, 30*b* allow a user to provide input to the power tool 10 to thereby control the power tool 10. The user control 30*a* can be a speed setting knob that is operatively mounted to the circuit board 22 for controlling the speed of the tool 10, and the user control 30*b* can be a spindle lock button for locking and unlocking the spindle assembly 12. It will be appreciated that the power tool 10 can include any suitable user controls 30*a*, 30*b* without departing from the scope of the present disclosure.

The motor assembly 11 further includes a housing assembly, generally indicated at 32. The housing assembly 32 supports the motor 14, the spindle assembly 12, and the electronics assembly 20 as will be described in greater detail below.

In the embodiment shown, the housing assembly 32 includes a field case 34 that partially encases the field member 16 and the armature 18. The field case 34 can be made out of any suitable material, such as a polymeric material. In the embodiment shown, the field case 34 includes a symmetrical outer wall 36 and a cap 38. The cap 38 is provided on one end of the outer wall 36 and substantially covers the field member 16. The cap 38 further provides an area for mounting the circuit board 22.

Figure 5:
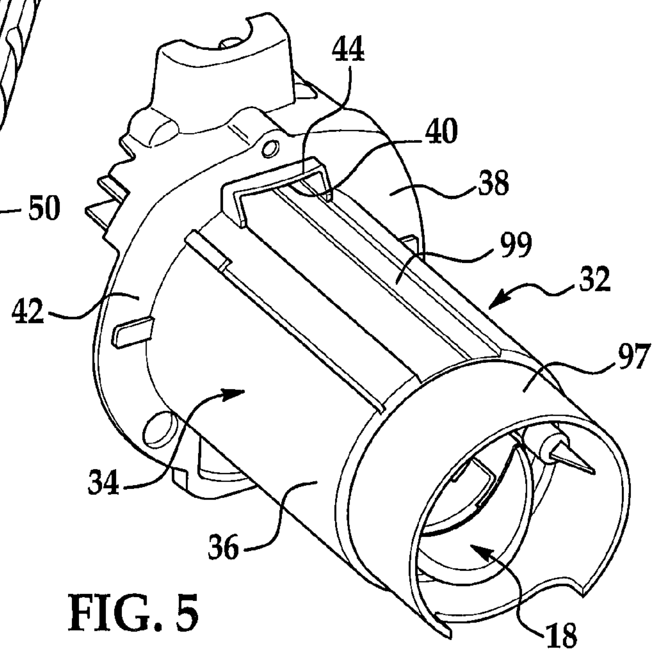
FIG. 5 is a perspective view of a field case of the power tool of FIG. 1.

As best seen in FIG. 5, the field case 34 includes an opening 40. In the embodiment shown, the opening 40 is defined through the cap 38. More specifically, the cap 38 includes an outer flange 42, which extends outwardly from the outer wall 36, and the opening 40 extends vertically through the outer flange 42 of the cap 38. As shown in FIG. 5, the field case 34 includes extension walls 44 that extend downward from the cap 38 to thereby extend the length of the opening 40. In the embodiment shown, the opening 40 is rectangular in shape.

The housing assembly 32 further includes an outer member 46. The outer member 46 at least partially encases the field member 16 and the field case 34. More specifically, in the embodiment shown, the outer member 46 is generally hollow and cylindrical. In one embodiment, the outer member 46 is made out of a metallic material. The outer member 46 defines an open top end 48 through which a portion of the armature 18 extends and through which the cap 38 of the field case 34 protrudes. The outer member 46 also includes a partially closed bottom end 50. The bottom end 50 of the outer member 46 includes a central opening 52 through which the spindle assembly 12 protrudes. The bottom end 50 also includes a plurality of light apertures 54 provided on the periphery of the bottom end 50. Furthermore, the bottom end 50 includes a plurality of light channels 56 provided on the outer periphery of the bottom end 50. The light apertures 54 and light channels 56 allow light to be transmitted out of the housing assembly 32 as will be described in greater detail below.

The field case 34 and the outer member 46 of the housing assembly 32 are fixedly coupled. In the embodiment shown, fasteners 58 extend through the outer member 46 and the flange 42 of the field case 34 to thereby couple the field case 34 and the outer member 46.

As shown in FIG. 2, the outer wall 36 of the field case 34 and the outer member 46 cooperate to define a space 60 therebetween. More specifically, the space 60 is defined longitudinally below the opening 40 and around the lower end of the field case 34.

Figure 3:
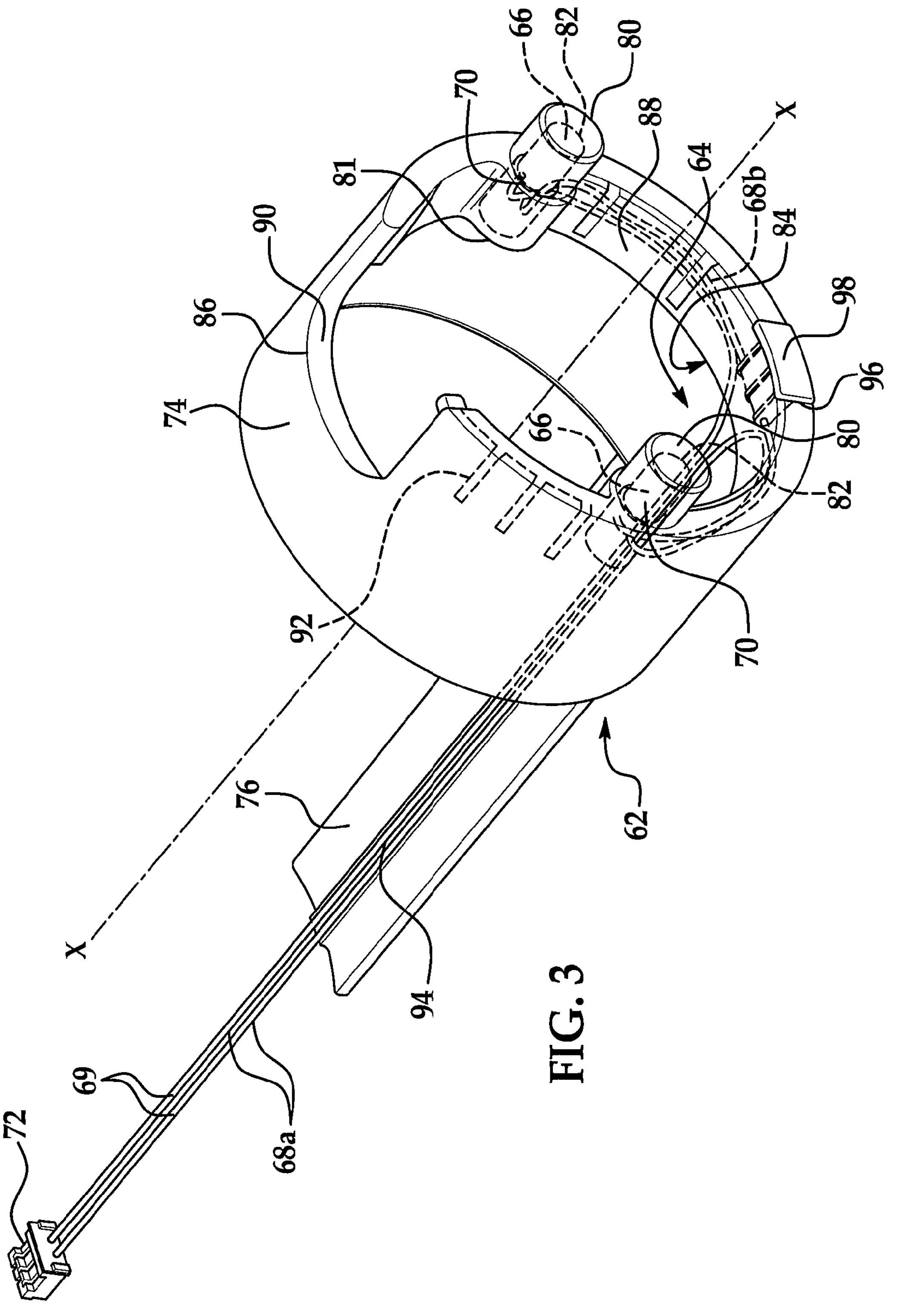
FIG. 3 is a perspective view of an embodiment of a light holder and a lighting assembly of the power tool of FIG. 1.

The power tool 10 further includes a light holder generally indicated at 62. The light holder 62 is provided in the space 60 so as to be supported by the housing assembly 32. The light holder 62 supports a lighting assembly 64 as shown in FIG. 3. The lighting assembly 64 includes at least one light 66 and an energy line 68*a*, 68*b* that transmits energy to the light 66 to thereby provide illumination for the power tool 10.

More specifically, in the embodiment shown, the lighting assembly 64 includes a plurality of lights 66 that are approximately equally spaced radially from a longitudinal axis X of the housing assembly 32. The lights 66 are also approximately equally spaced circumferentially about a longitudinal axis X of the housing assembly 32. In one embodiment, the lights 66 are light emitting diodes (LEDs). Also, the energy lines 68*a*, 68*b* are conductive wires including first energy lines 68*a* and a second energy line 68*b* (i.e., a jumper line). One end of each first energy line 68*a* is electrically connected to one of the respective lights 66 and the second energy line 68*b* is electrically connected at each end to one of the lights 66. Also, in one embodiment, the lights 66 each include a circuit board 70 on a top end thereof for providing electrical connection between the energy lines 68*a*, 68*b* and the respective light 66. Furthermore, the lighting assembly 64 includes a connector 72 operatively connected to the first energy lines 68*a* at ends opposite to the lights 66. The connector 72 can be of any suitable known type and can be either a male or female connector.

In the embodiment shown, the light holder 62 includes a ring 74 on a lower end thereof, and an arm 76 extending parallel to the axis X from the ring 74. In one embodiment, the arm 76 and ring 74 are integrally attached. Furthermore, in one embodiment, the entire light holder 62 is made out of a light-transmissive material (e.g., clear LEXAN). As such, when the lights 66 are operative, light can transmit through the transmissive material of the light holder 62 for increased illumination.

As shown in FIG. 3, the light holder 62 includes a plurality of light cups 80, and light pockets 82 are defined within the light cups 80. Each light cup 80 is cylindrical and hollow with a top end 81 that is open to the interior of the housing assembly 32. The light cups 80 extend in the axial direction from the ring 74 of the light holder 62.

A light 66 is provided within each light pocket 82 of the respective light cup 80. In one embodiment, the open top end 81 is plugged with epoxy to thereby substantially encapsulate the light 66 within the light cup 80.

Furthermore, the light holder 62 includes a line pocket 84 at a lower end of the ring 74. The line pocket 84 holds at least a portion of the energy lines 68*a*, 68*b*. More specifically, the ring 74 of the light holder 62 includes an outer wall 86 that is ring-shaped and an inner wall 88 that is coupled to the outer wall 86 and extends axially from the lower end thereof. The inner wall 88 is spaced slightly from the outer wall 86 so as to define the line pocket 84 between the inner and outer walls 88, 86. As shown in FIG. 3, a portion of the first energy lines 68*a* and the second energy line 68*b* are disposed and retained within the line pocket 84.

The light holder 62 further includes a cut out 90. The cut out 90 is disposed between the light cups 80 in the embodiment shown. The cut out 90 provides clearance for the spindle lock button 30*b* (FIG. 2) in the embodiment shown.

Additionally, in the embodiment shown, the light holder 62 includes a plurality of ribs 92. The ribs 92 extend axially along the lower portion of the ring 74. The ribs 92 can increase structural rigidity of the light holder 62

The arm 76 of the light holder 62 is slightly curved about the longitudinal axis X of the light holder 62 such that the light holder 62 substantially conforms to the profile of the space 60. The arm 76 also includes a plurality of line retainers 94. In the embodiment shown, the line retainers 94 comprise elongated channels partially recessed into the thickness of the arm 76. The first energy lines 68*a* are pressed into the line retainers 94 such that the first energy lines 68*a* are frictionally retained therein. Furthermore, in the embodiment shown, the line retainers 94 extend along the entire length of the arm 76 and the top axial portion of the ring 74. In one embodiment, the length of the line retainers 94 enable the first energy lines 68*a* to gradually bend out of the respective line retainer 94 toward the respective light 66. Also, in one embodiment, epoxy is layered over the first energy lines 68*a* such that the first energy lines 68*a* are substantially encapsulated by the epoxy and the light holder 62.

Furthermore, in one embodiment, the light holder 62 is molded, and in order to facilitate the molding process, the light holder 62 includes an opening 96 located at the lower end of the ring 74 below the arm 76 and the line retainers 94. Furthermore, a plug 98 is coupled to the light holder 62 to thereby close the opening 96.

Additionally, as shown in FIG. 3, the light holder 62 supports the lights 66 and the energy lines 68*a*, 68*b* leaving respective free ends 69 of the first energy lines 68*a* extending freely from the arm 76 of the light holder 62. As such, as shown in FIGS. 2 and 4, the free end 69 of the first energy lines 68*a* and the connector 72 extend through the field case 34 via the opening 40 so as to couple to the lighting power source 28. Accordingly, the assembly of the power tool 10 is facilitated and electrical connection of the lights 66 is ensured. Also, manufacture of the lighting assembly 64 is easier because tolerancing can be looser, etc.

In the embodiment shown in FIGS. 4 and 5, the field case 34 includes at least one recess 97, 99 that receives the light holder 62. More specifically, the field case 34 includes a ring recess 97 on an outer surface of the lower end of the field case 34. Also, the field case 34 includes an arm recess 99 extending upward longitudinally along the outer surface of the field case 34 below the opening 40. As shown in FIG. 4, the light holder 62 is positioned such that the ring 74 is received within the ring recess 97, and the arm 76 is received in the arm recess 99. Accordingly, the power tool 10 is more compact because the outer surfaces of the field case 34 and the light holder 62 are substantially flush. It will be appreciated that the outer member 46 of the housing assembly 32 could additionally and/or alternatively include recesses that receive the light holder 62.

In order to assemble the motor assembly 11 of the power tool 10, the light holder 62 is positioned in the outer member 46 such that the light cups 80 are disposed in the light channels 56. Then, the field case 34, the motor 14, and the spindle assembly 12 are positioned within the outer member 46. As such, the ring 74 of the light holder 62 encircles the spindle assembly 12, and the arm 76 of the light holder 62 extends longitudinally upward between the outer member 46 and the outer wall 36 of the field case 34. In the embodiment shown, the arm 76 partially extends into the opening 40 of the field case 34. It will also be appreciated that the first energy lines 68*a* are disposed between the outer wall 36 of the field case and the arm 76 of the light holder 62. As such, the first energy lines 68*a* are retained within the power tool 10. Next, the free end 69 of the first energy lines 68*a* are threaded through the opening 40 and wrapped up and over the electronics assembly 20. As shown in FIG. 4, the free end 69 of the first energy lines 68*a* are pressed into additional line retainers 100 located on the circuit board 22. Then, the connector 72 plugs into the lighting power source 28 as shown in FIG. 4. Lastly, remaining components (not shown), such as outer housing members, and the like, are attached to complete the motor assembly 11 of the power tool 10.

Thus, the lights 66 of the power tool 10 provide illumination for more accurate wood working, etc. Light is transmitted through the light channels 56 and through the light apertures 54 of the outer member 46. This light transmits out of the motor assembly 11 and through the support 25 of the base assembly 13. As discussed above, the lighting assembly 64 and the light holder 62 allow for easier assembly and manufacturing and ensure proper electrical coupling. Furthermore, the power tool 10 is more compact due to, for instance, the recesses 97, 99 of the field case 34, which enable passage of the first energy lines 68*a* from the working end of the housing assembly 32, where lighting is desired, to the opposite axial end of the housing assembly 32, where the electrical components (and the source of electrical power) are located.

Figure 6:
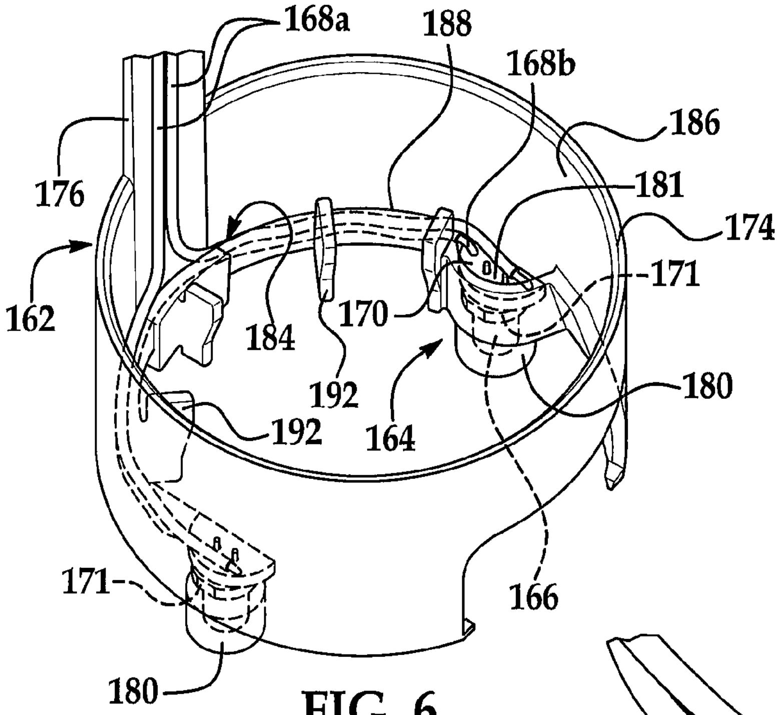
FIG. 6 is a perspective view of a light holder and a lighting assembly according to another exemplary embodiment of the present disclosure.
Figure 7:
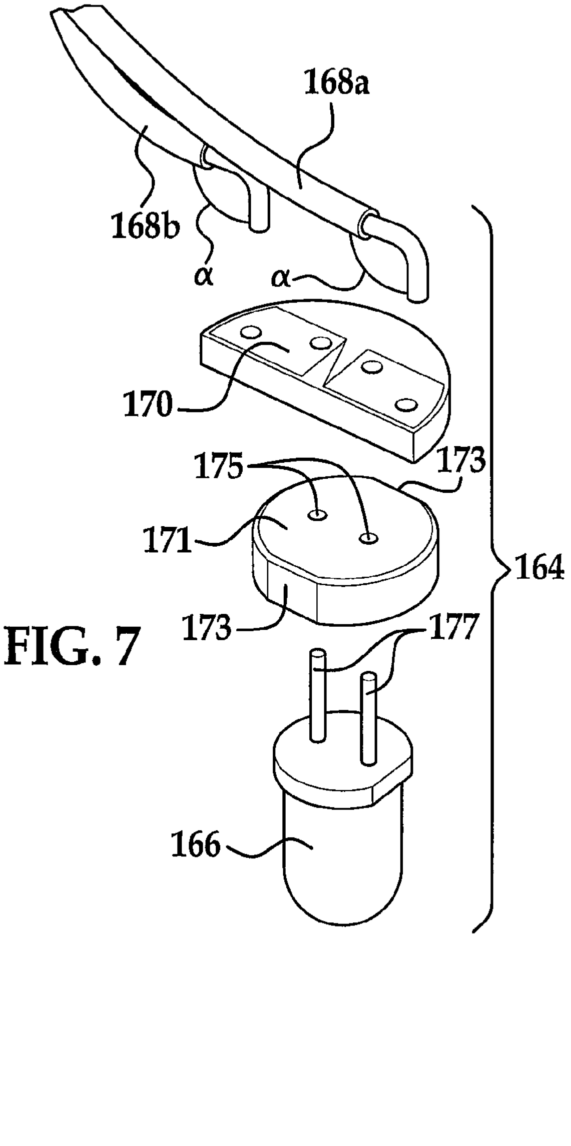
FIG. 7 is an exploded perspective view of a portion of the lighting assembly of FIG. 6.

Referring now to FIGS. 6 and 7, other exemplary embodiments of the light holder 162 and lighting assembly 164 are illustrated. It will be appreciated that components corresponding to those of the embodiment of FIGS. 1-5 are indicated with corresponding reference numerals increased by 100. It will also be appreciated that the light holder 162 and lighting assembly 164 could be incorporated in the power tool 10 shown in FIG. 1.

As shown in FIG. 6, the light holder 162 can include a ring 174 and an arm 176 similar to the embodiments of FIGS. 1-5. The ring 174 can include an outer wall 186 and an inner wall 188 that are spaced with respect to each other to define a line pocket 184 therebetween. The light holder 162 can also include a plurality of light cups 180 with open top ends 181 similar to the embodiments of FIGS. 1-5.

Also, as shown in FIG. 6, the light holder 162 can include ribs 192 extending from the outer wall 186 toward the axis X of the tool 10. The ribs 192 can increase the rigidity of the light holder 162. Also, in some embodiments, the ribs 192 can be configured to direct air flow through the tool 10 during operation.

Like the embodiments of FIG. 1-5, the lighting assembly 164 can be supported by the light holder 162 such that the lights 166 are each disposed in a corresponding light cup 180. Also, the energy lines 168*a*, 168*b* can be electrically connected to the lights 166 similar to the embodiments of FIGS. 1-5. The energy lines 168*a*, 168*b* can also be disposed within the line pocket 184, and the first energy lines 168*a* can be supported on the arm 176 similar to the embodiments of FIGS. 1-5.

As shown in FIG. 7, the lighting assembly 164 can include the lights 166 and the circuit board 170. The circuit board 170 can have a shape corresponding to the open top end 181 of the light cup 180. For instance, in some embodiments, the circuit board 170 can have a half-circular shape. Also, in some embodiments, the circuit board 170 can be a printed circuit board.

The energy lines 168*a*, 168*b* electrically and mechanically connect to the circuit board 170, such as by soldering. Furthermore, the energy lines 168*a*, 168*b* can be bent at an angle, $\alpha$, adjacent the circuit board 170. In some embodiments, the angle, $\alpha$, is approximately ninety degrees. Because the energy lines 168*a*, 168*b* are bent at the angle, $\alpha$, the energy lines 168*a*, 168*b* can extend from the light 166 and directly toward and into the line pocket 184. Accordingly, the tool 10 can be easier to assemble, and the energy lines 168*a*, 168*b* can have a lower profile such that the tool 10 is more compact.

As shown in FIG. 6, the light cups 180 can be arranged such that the open top ends 181 face toward the interior of the housing assembly 32 (FIG. 2), and as such, dust and other debris generated during use of the tool 10 are less likely to enter the light cups 180. Accordingly, the amount of lighting provided by the lights 166 is less likely to be reduced by dust and debris.

Furthermore, as shown in FIG. 7, a plug 171 can be included between the light 166 and the circuit board 170. The plug 171 can include apertures 175 through which electrodes 177 of the light 166 extend to connect to the circuit board 170. The plug 171 can be made out of any suitable material, such as a rubber material. Also, the plug 171 can be shaped according to the top end 181 of the light cup 180 so as to substantially seal against the interior of the light cup 180. In some embodiments, for instance, the plug 171 can be substantially circular and disc shaped with flat surfaces 173 on opposite sides. Accordingly, the plug 171 can substantially encapsulate the light 166 within the light cup 180 and inhibit dust and debris from entering the light cup 180 during use of the tool 10. Thus, the amount of lighting provided by the lights 166 is less likely to be reduced by dust and debris.

It will also be appreciated that a sealant (not shown), such as epoxy, can be applied to the top end 181 of the light cups 180. Accordingly, the epoxy can reinforce the mechanical connection between the energy lines 168*a*, 168*b* and the circuit board 170. Also, the epoxy can further seal the top end 181 to reduce intrusion of dust and debris into the light cups 180.

The present disclosure has been described in an illustrative manner. It is to be understood that the terminology which has been used is intended to be in the nature of words of description rather than of limitation. Many modifications and variations are possible in light of the above teachings. Therefore, within the scope of the appended claims, the present disclosure may be practiced other than as specifically described.

What is claimed is:

1. A power tool comprising:

a motor;

a lighting power source;

a housing assembly defining an axis that supports the motor and the lighting power source; and a lighting sub-assembly that is mounted to the housing assembly, the lighting sub-assembly including:

a lighting assembly comprising a plurality of lights and an energy line that transmits energy to the lights to thereby provide illumination, the lights being spaced apart from each other, the lights and the lighting power source disposed in spaced relationship from each other relative to the axis; and a light holder removably supported by the housing assembly, the light holder supporting each of the lights at a respective light support, the light holder also including a connecting portion that extends between and connects the light supports, the light holder further supporting a portion of the energy line such that an end of the energy line unsupportedly extends beyond the light holder and electrically couples to the lighting power source, wherein the light supports and the connecting portion each include a light-transmissive material.

2. The power tool of claim 1, wherein the light holder is entirely made of a light-transmissive material.

3. The power tool of claim 1, wherein the plurality of lights are approximately equally and symmetrically spaced about the axis of the housing assembly.

4. The power tool of claim 1, wherein the housing assembly includes a member with an opening, the end of the energy line extending through the member via the opening to electrically couple to the lighting power source.

5. The power tool of claim 4, wherein the motor includes a field member that creates a magnetic field, wherein the member is a field case that at least partially encases the field member, the field case including an outer wall and a cap that substantially covers the field member, wherein the opening is defined through the cap.

6. The power tool of claim 1, wherein the housing assembly includes a field member that creates a magnetic field, a field case that encases the field member, and an outer housing member that at least partially encases the field member and the field case, wherein the light holder is provided between the field case and the outer housing member.

7. The power tool of claim 6, wherein the field case defines a recess that receives the light holder.

8. The power tool of claim 1, further comprising a spindle assembly, and wherein the connecting portion of the light holder includes a ring that encircles the spindle assembly.

9. The power tool of claim 8, wherein the light is supported by the ring of the light holder.

10. The power tool of claim 8, wherein the ring includes an outer wall and an inner wall, the inner wall being coupled the outer wall, the inner wall being disposed in spaced relationship relative to the outer wall to define a line pocket between the inner and outer walls, the line pocket receiving the portion of the energy line.

11. The power tool of claim 8, wherein the light holder includes an arm that is coupled to the ring and extends from the ring, the arm supporting the portion of the energy line such that the end of the energy line unsupportedly extends beyond the arm and electrically couples to the lighting power source.

12. The power tool of claim 1, wherein the light supports each includes a light cup in which the light is received, the light cup including an open end that is open toward an interior of the housing assembly.

13. The power tool of claim 12, further comprising a plug that substantially seals the open end of the light cup.

14. The power tool of claim 1, wherein the light holder includes a line retainer that fixedly retains the energy line to the light holder.

15. A power tool comprising:

a motor with a field member that creates a magnetic field;

a lighting power source;

a housing assembly defining an axis, the housing assembly including a field case that at least partially encases the field member and an outer housing member that at least partially encases the field case and the field member, the field case including an opening; and a lighting sub-assembly that is mounted to the housing assembly, the lighting sub-assembly including:

a lighting assembly comprising a light and an energy line that transmits energy from the lighting power source to the light to thereby provide illumination, the light and the lighting power source disposed in spaced relationship from each other relative to the axis, the energy line extending through the opening in the field case; and a light holder removably supported by the housing assembly, the light holder supporting the light and the energy line;

wherein the light holder supports the light and a portion of the energy line such that an end of the energy line that is opposite the light unsupportedly extends beyond the light holder and electrically couples to the lighting power source.

16. The power tool of claim 15, wherein the field case defines a recess that receives the light holder and the energy line such that the light holder and the energy line are disposed between the field case and the outer housing member.

17. A router comprising:

a motor with a field member that creates a magnetic field;

a spindle assembly that is drivingly rotated by the motor;

a lighting power source;

a housing assembly that defines an axis and that supports the motor and the lighting power source, the housing assembly including a field case that at least partially encases the field member, the field case including an outer wall and a cap that covers the field member, the field case defining an opening through the cap, the housing assembly also including an outer housing member that at least partially encases the field member and the field case;

a lighting assembly comprising a light emitting diode and an energy line that transmits energy to the light emitting diode to thereby provide illumination, the light emitting diode and the lighting power source disposed in spaced relationship from each other relative to the axis; and a light holder made out of a light-transmissive material, the light holder including a ring and an arm that is integrally attached to the ring and extends therefrom, the ring encircling the spindle assembly, the ring including a light cup in which the light emitting diode is received, the ring also including an outer wall and an inner wall that is coupled to and disposed in spaced relationship relative to the outer wall to define a line pocket between the inner and outer walls, the line pocket receiving a first portion of the energy line, the arm including a line retainer that retains a second portion of the energy line, the light holder received in a recess of the field case between the field case and the outer housing member, an end of the energy line extending unsupportedly beyond the arm, through the opening of the cap, and electrically coupling to the lighting power source.

18. A power tool comprising:

a motor;

a spindle assembly;

a lighting power source;

a housing assembly defining an axis that supports the motor and the lighting power source;

a lighting assembly comprising a light and an energy line that transmits energy to the light to thereby provide illumination, the light and the lighting power source disposed in spaced relationship from each other relative to the axis; and a light holder supported by the housing assembly, the light holder supporting the light and a portion of the energy line such that an end of the energy line unsupportedly extends beyond the light holder and electrically couples to the lighting power source, the light holder including a ring that encircles the spindle assembly.

19. The power tool of claim 18, wherein the light is supported by the ring of the light holder.

20. The power tool of claim 18, wherein the ring includes an outer wall and an inner wall, the inner wall being coupled the outer wall, the inner wall being disposed in spaced relationship relative to the outer wall to define a line pocket between the inner and outer walls, the line pocket receiving the portion of the energy line.

21. The power tool of claim 18, wherein the light holder includes an arm that is coupled to the ring and extends from the ring, the arm supporting the portion of the energy line such that the end of the energy line unsupportedly extends beyond the arm and electrically couples to the lighting power source.

22. The power tool of claim 1, wherein the housing assembly includes a plurality of light channels and at least one light aperture, wherein light is transmitted from the light supports out of the housing assembly through respective ones of the plurality of light channels, and wherein light is transmitted from the connecting portion out of the housing assembly through the at least one light aperture.

23. The power tool of claim 15, wherein the light holder includes a ring that supports the light and an arm that extends from the ring, the arm having a curvature that conforms to a curvature of the field case.

24. A power tool comprising:

a motor;

a lighting power source;

a housing assembly defining an axis that supports the motor and the lighting power source; and a lighting sub-assembly that is mounted to the housing assembly, the lighting sub-assembly including:

a lighting assembly comprising a light and an energy line that transmits energy to the light to thereby provide illumination, the light and the lighting power source disposed in spaced relationship from each other relative to the axis;

a light holder removably supported by the housing assembly, the light holder supporting the light and a portion of the energy line such that an end of the energy line unsupportedly extends beyond the light holder and electrically couples to the lighting power source, the light holder including a light cup in which the light is received, the light cup including an open end that is open toward an interior of the housing assembly; and a plug that substantially seals the open end of the light cup.

* * * * *